US006645062B1

(12) United States Patent
Buckles

(10) Patent No.: US 6,645,062 B1
(45) Date of Patent: Nov. 11, 2003

(54) METHOD AND APPARATUS FOR STUFFING HAMS

(75) Inventor: John K. Buckles, Austin, MN (US)

(73) Assignee: Hormel Foods, LLC, Austin, MN (US)

( * ) Notice: Subject to any disclaimer, the term of this patent is extended or adjusted under 35 U.S.C. 154(b) by 0 days.

(21) Appl. No.: 10/232,440

(22) Filed: Aug. 29, 2002

(51) Int. Cl.[7] ............................................. A22C 11/02
(52) U.S. Cl. ........................................... 452/35; 452/30
(58) Field of Search ............................. 452/35, 30, 32, 452/31, 21

(56) References Cited

U.S. PATENT DOCUMENTS

| | | | |
|---|---|---|---|
| 2,696,442 A | 12/1954 | Allbright | 99/187 |
| 2,696,443 A | 12/1954 | Allbright | 99/187 |
| 3,134,681 A | 5/1964 | Hawley | 99/174 |
| 3,290,841 A | 12/1966 | Sartore | 53/258 |
| 3,644,125 A | 2/1972 | Lobiondo et al. | 99/107 |
| 3,719,022 A | 3/1973 | Cherio et al. | 53/255 |
| 5,109,648 A * | 5/1992 | Evans | 53/134.1 |
| 5,364,302 A | 11/1994 | Shibata et al. | 452/174 |
| 5,391,108 A * | 2/1995 | Feldt | 452/21 |
| 5,468,179 A | 11/1995 | Stanely et al. | 452/37 |
| 5,654,023 A | 8/1997 | Secord | 426/412 |

* cited by examiner

Primary Examiner—Charles T. Jordan
Assistant Examiner—Judith A. Nelson
(74) Attorney, Agent, or Firm—IPLM Group, P.A.

(57) ABSTRACT

A combination stuffing horn (60) and skin brake (70) allows for a stuffing apparatus (10) for meat products (130) to be utilized. The stuffing horn (60) includes an elongate member (62) with a bore (62a) through which the meat product passes. The elongate member (62) has an outer cross section. The skin brake (70) has an inflatable bladder which is positioned around the elongate member. The bladder, when inflated, conforms to the outer cross section, wherein pressure is exerted on a shirred casing as the casing is being pulled over the horn (60) as the meat product (130) is stuffed into the casing.

11 Claims, 9 Drawing Sheets

METHOD AND APPARATUS FOR STUFFING HAMS

BACKGROUND OF THE INVENTION

1. Field of the Invention

This invention relates generally to a method and apparatus for stuffing hams, and more particularly, to a method and apparatus for stuffing hams and the like utilizing a skin brake with an inflatable bladder and also to a method and apparatus for stuffing hams and the like utilizing a non-circular stuffing arm horn and non-circular skin brake.

2. Description of the Prior Art

It is well known to stuff hams, other meats and the like into casings for further processing or sale. Hams, which typically have more of an oval shape, are stuffed by hand into the casing or netting. The casing or netting is sewn into individual socks. Stuffing horns that have been utilized with other meat products, and which also use shirred casing or netting, have typically been round in shape. Therefore, the use of round stuffing horns would not be appropriate in the process for hams or other non-circular products. A round stuffing horn would change the overall shape of the ham, when the consumer has come to expect an oval shape for hams.

For various other meat products, where no casing is utilized, non-circular stuffing horns have been used. However, the use of netting in the past has made it difficult to use a non-circular stuffing horn. A tension must be placed on the shirred casing as the product is being stuffed into the casing. When the horn is circular, there are numerous mechanical devices available to create tension on the casing and therefore provide for a well-stuffed product. However, to date, Applicant is unaware of any mechanism to apply appropriate tension to the casing around a non-circular stuffing horn.

Hams are often made up of two or more muscles. The two or more muscles are stuffed into a casing, by hand, and bound together for later cooking and tumbling. A mechanized way of stuffing would be advantageous, but due to the shape of the ham products, it has not been able to be accomplished. The present invention addresses the problems associated with the prior art devices and provides for a method and apparatus for stuffing hams and the like through a non-circular stuffing horn and also provides for a skin brake utilizing an inflatable bladder.

SUMMARY OF THE INVENTION

In one embodiment, the invention is an apparatus for stuffing a meat product into a casing. The apparatus includes a conveyor having a plurality of holders for receiving a meat product. The holders have an exit. A pushing mechanism is moveable between a first position and a second position, wherein movement of the mechanism to the second position moves the meat product out of the exit of the holder. A non-circular skin brake is positioned around the stuffing horn. The skin brake has a non-circular aperture and has an inflatable bladder around the aperture, wherein pressure is exerted on a casing as the meat product is stuffed into the casing.

In another embodiment, the invention is a combination stuffing horn and skin brake for use with a stuffing apparatus for a meat product. The combination includes a stuffing horn having an elongate member. The elongate member has a central bore through which a meat product passes. The elongate member has an outer cross section. A skin brake has an inflatable bladder. The bladder is positioned around the elongate member. The bladder, when inflated, conforms to the outer cross section, wherein pressure is exerted on the shirred casing as the casing is pulled over the horn as the meat product is stuffed into the casing.

In another embodiment, the invention is a method of stuffing a meat product into a shirred casing. The method includes placing a shirred casing over a stuffing horn having an outer cross section. Meat is inserted into the stuffing horn. A bladder of a skin brake is inflated, wherein the bladder exerts an even pressure on the casing. The meat product has pushed through the stuffing horn and into the casing, thereby stuffing the meat product into the casing.

DETAILED DESCRIPTION OF A PREFERRED EMBODIMENT

Figure 1:
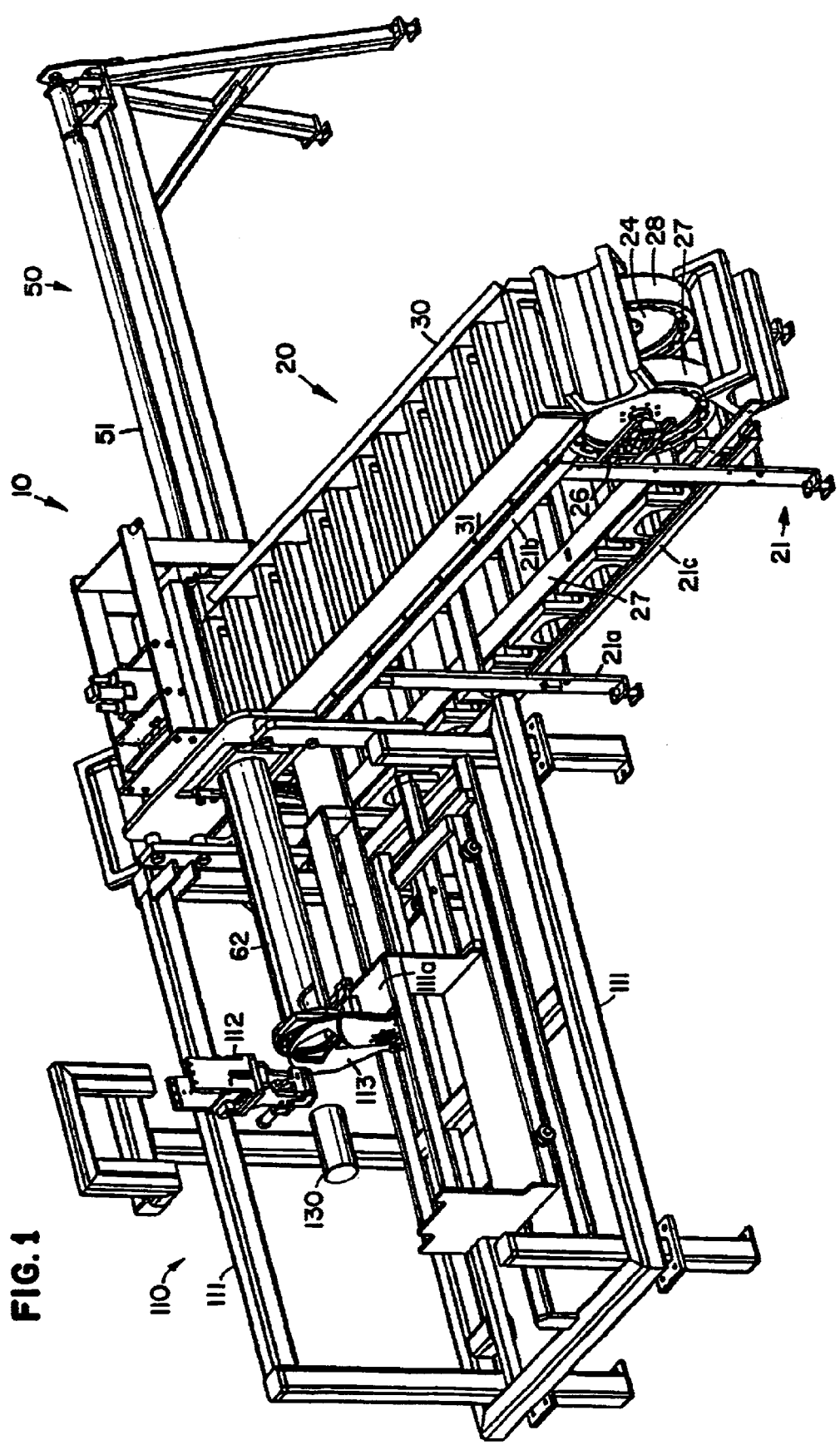
FIG. 1 is a perspective view of the stuffing apparatus of the present invention, viewed generally from above and to the left.

Referring to the drawings, wherein like numerals represent like parts throughout the several views, there is generally disclosed at 10 a stuffing apparatus for stuffing ham, meat products or the like. The stuffing apparatus 10 includes an input section, generally designated at 20. A frame 21 may be any suitable frame and includes a plurality of upright legs 21a supporting upper longitudinal members 21b and lower longitudinal members 21c, supported by cross braces 21d. Two rear rollers 24, 25 are operatively connected to the legs 21a by suitable means such as brackets 26. Similar brackets (not shown) support forward rollers 22, 23 to the legs 21a. First and second conveyor belts 27, 28 are rotatably mounted on the forward rollers 22, 23 and rear rollers 24, 25, by means well known in the art. A plurality of breach boxes 29 are operatively connected to the plastic timing belts 27, 28 by suitable means such as being bolted on to the belts 27, 28. The breach boxes function as holders for the hams or the like prior to stuffing. The remainder of the application may refer to the meat products as being hams, it being understood that other suitable meat products, such as spiral hams, Virginia hams, turkey breasts, bellies for round bacon slicing or beef products may also be used for meat products. For hams, quite often more than one muscle is stuffed into a single net and the breach boxes 29 provides for a holder for receiving the meat products. The breach boxes 29 have a cavity 29a which is open at the top and at both ends. Two side members 30, 31 are supported on the frame 20 and provide ends for the breach boxes 29 as the breach boxes 29 travel along the conveyor. The cavity 29a is in the general shape of an oval and is similar to that for the stuffing horn 60, which will be described in more detail hereafter. The rollers 22, 25 are driven by a suitable means such as a servo motor (not shown).

Figure 2:
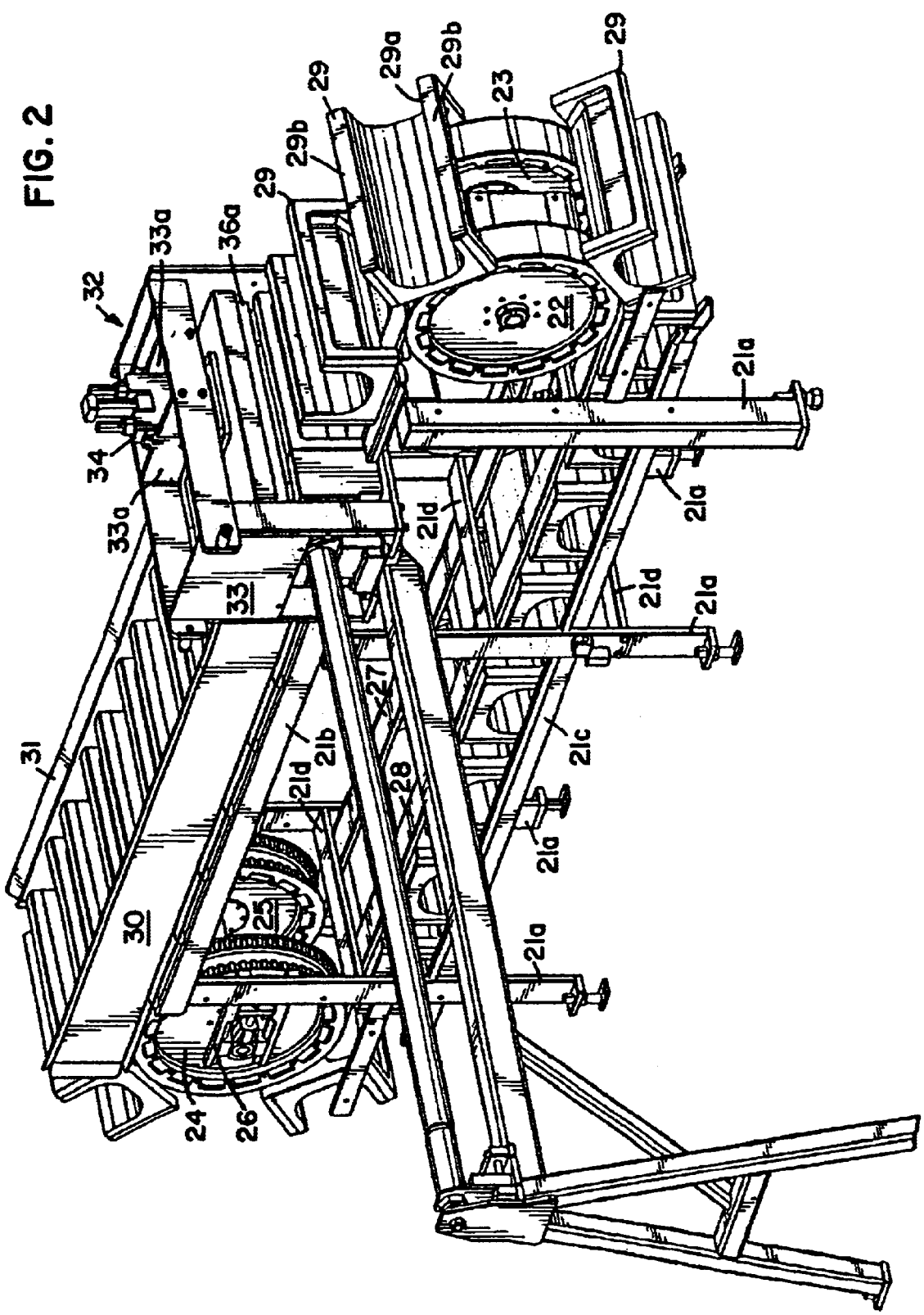
FIG. 2 is a perspective view of the stuffing apparatus shown in FIG. 1, viewed generally from the right side.
Figure 7:
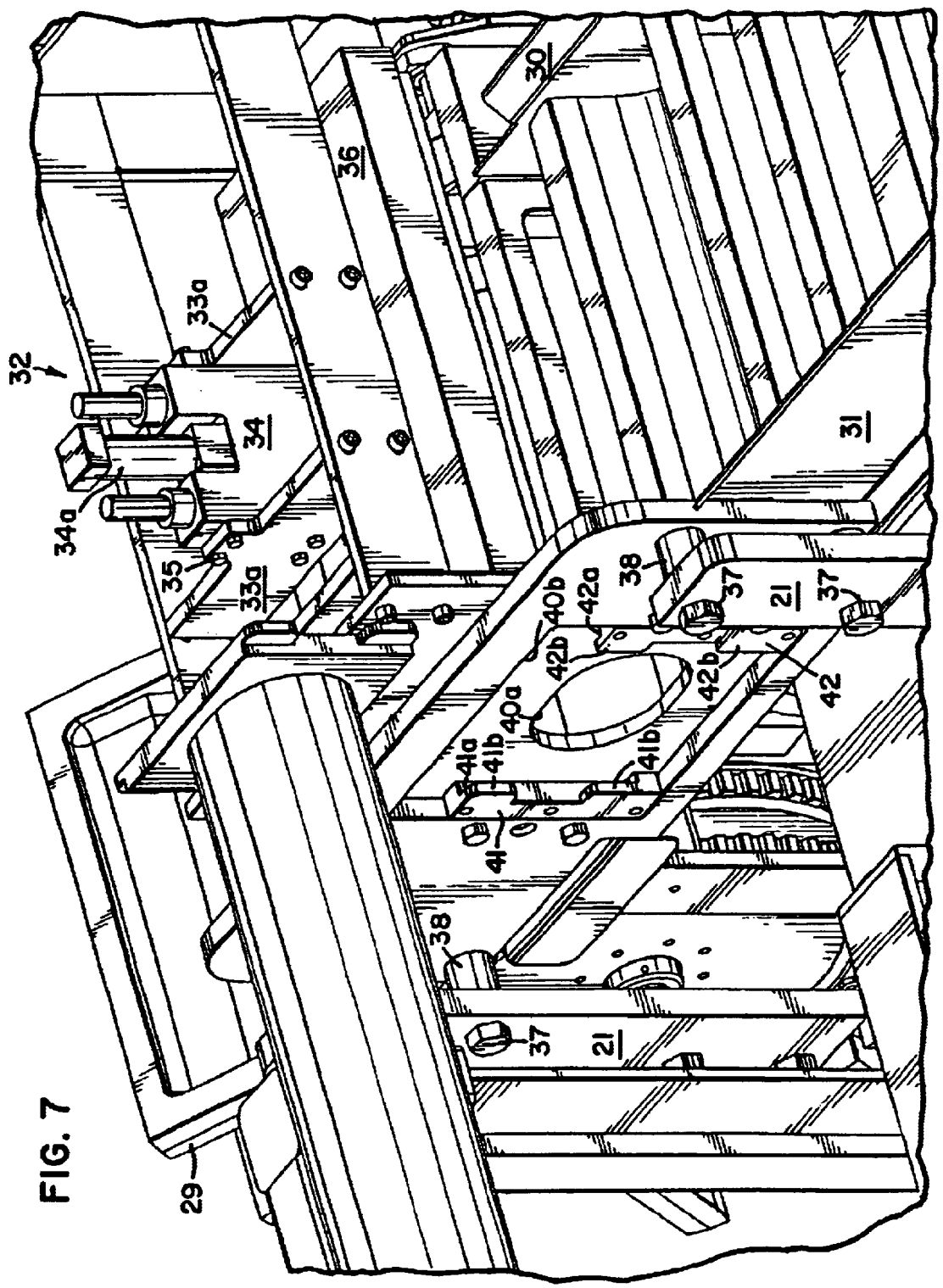
FIG. 7 is an enlarged perspective view of the stuffing horn shown exploded away from the stuffing apparatus shown in FIG. 1.

As can be seen in FIGS. 1 and 2, the cavities 29a of the breach boxes 29 are open to the top. The muscles for the hams or other meat products are placed in the breach boxes which are in the general shape of the desired configuration of the ham. The sides 30, 31 act to contain the meat product inside of the cavity 29a. There are a plurality of breach boxes 29 so that workers may have a number of cavities 29a to load. The top of the cavity 29a is open. Therefore, when it is time to push the meat product into the stuffing horn 30, it is desired to contain the meat product from the top. A cover assembly, generally designated as 32, is operatively connected to the frame 21. The frame 33 of the cover assembly 32 includes two cross members 33a. A piston assembly 34 is mounted between the cross members 33a by suitable means such as nuts and bolts 35. The piston assembly 34 has a piston 34a that reciprocates in an up and down motion. The piston 34a is connected to a cover 36 is operatively connected to the piston 34a to allow the cover 36 to move from a disengaged position to an engaged position. As shown in FIG. 7, the cover 36 is disengaged, that is, the cover is up. As can be seen, the cover 36 has a lower member 36a that is sized and configured to fit inside of the cavity 29a. The lower member 36a is generally rectangular and is configured to cover the top of the cavity 29a when the cover 36 is in a lowered position. The protruding part of the cover 36 is positioned over the top of the two sides 29b of the breach boxes 29. Therefore, when in the down position, the meat product is contained and is more easily stuffed into the stuffing horn 60, as will be described more fully hereafter.

A pushing mechanism, generally designated as 50, is a portion of the stuffing apparatus 10. The pushing mechanism 51 has a cylinder assembly 51 having an extendable slide 52. Attached to the end of the slide 52 is a pushing plate 53. The pushing plate 53 is sized and configured to go through the opening 40a. The cavity 29a is also sized and configured to match the size and configuration of the opening 40a so as to allow the meat product to easily be pushed out of the cavity 29a by the pushing plate 53. The cylinder assembly 51 may be any suitable cylinder which has an extendable slide 52. The cylinder assembly 51 is preferably a back-to-back cylinder assembly such as those available from Allenair Corp., Mineola, N.Y. One of the cylinders provides for an extended travel of the slide 52 and the other of the cylinders would provide for a shorter travel of the slide 52. The slide 52 may be any suitable slide such as a Series SE slide from PHD Inc. of Fort Wayne, Ind. The operation of the back-to-back cylinders will be described more fully when the method of stuffing the meat product is more fully described hereafter.

Referring now to FIG. 7, an end plate 40 having an opening 40a formed therein is attached to the frame 21 by suitable means such as bolts 37 and stand offs 38. The end plate 40 provides the opening 40a through which the meat product is pushed. The end plate 40 also provides one method of attaching the stuffing horn 60 to the stuffing apparatus 10. However, it is understood that other suitable means may be utilized. The end plate 40 has a rectangular recess 40b. Inside of the recess 40b are mounted first and second L-shaped brackets 41, 42. The brackets 41, 42 are mirror images of each other and only one will be described in detail. Bracket 41 has a base 41 a that is secured to the end plate 40 by suitable means such as bolts. Extending inward at a 90 degree angle are two projections 41b. The projections are spaced from the end plate 40 and form a slot between the projections and the end plate. A similar slot is formed by the projections 42b. The opening between the base 41a and base 42a is sized and configured to accept the stuffing horn as will be described more fully hereafter.

Figure 3:
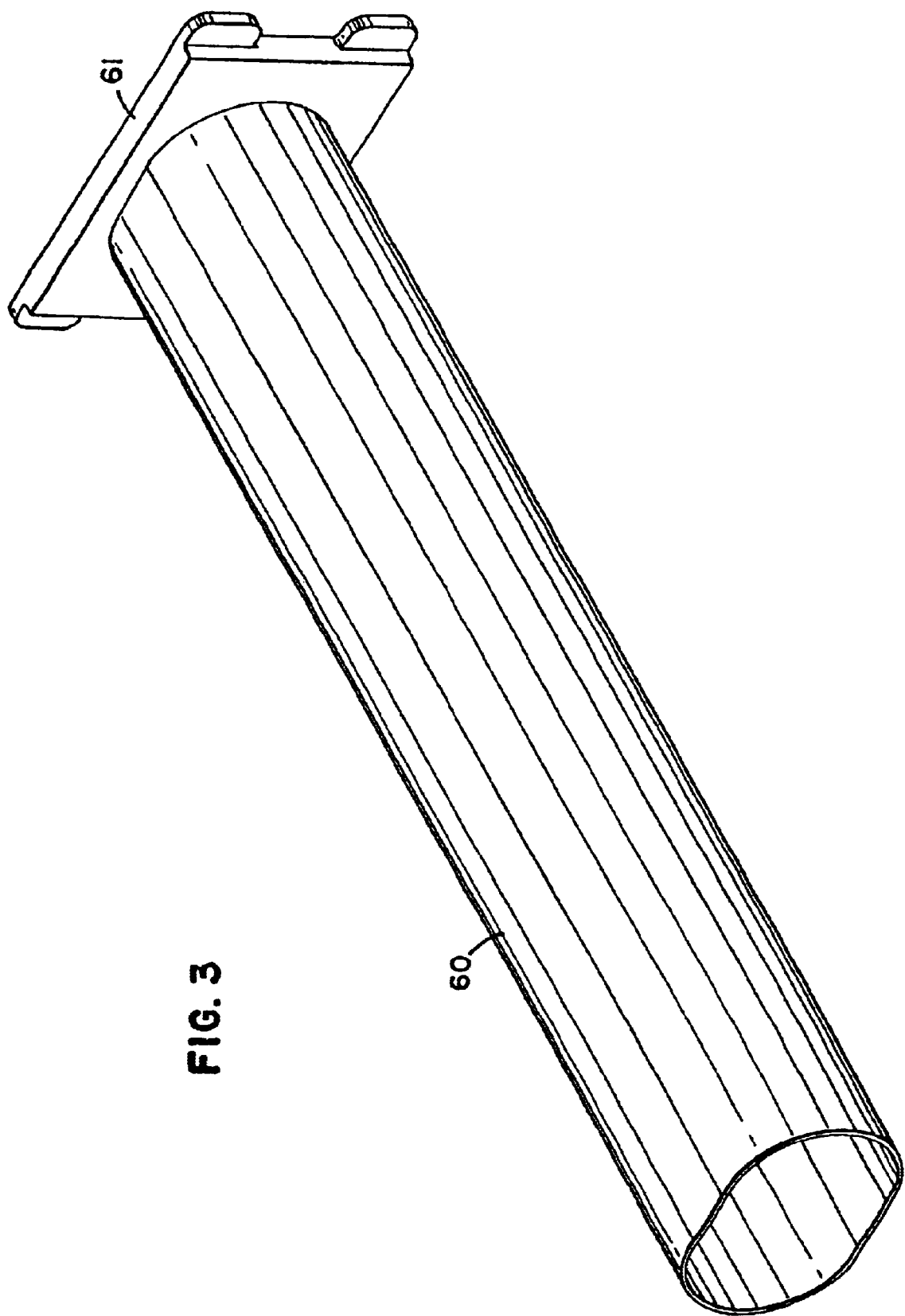
FIG. 3 is a perspective view of the stuffing horn shown in FIG. 1.

Referring to FIG. 3, a stuffing horn 60 shown. The stuffing horn 60 includes a mounting plate 61 and an elongate member 62. The elongate member 62 has a central bore 62a that extends throughout the member 62. The bore 62a is in alignment with and generally the same size and configuration as the opening 40a. The bore 62a extends through the mounting plate 61 and is positioned proximate the opening 40a. The bore 62a is non-circular. In a preferred embodiment, the bore 62a is oval. The outer cross section of the elongate member 62 is also non-circular and is preferably an oval. The outer cross section is preferably the same as the bore 62a. The mounting plate 61 is generally rectangular with four projections 61a. In FIG. 3, the fourth projection on the lower left is hidden from view by the elongate member 62. However, the projections 61a on the left side are mirror images of the projections on the right side. Referring now to both FIGS. 3 and 7, it can be seen how the stuffing horn 60 is mounted to the end plate 40. The stuffing horn 60 is brought proximate the end plate 40 with the lower projection 61a positioned between the opening between the upper projection 41a, 42a and lower projections 41b, 42b. This positions the upper projections 61a above the top projections 41b, 42b. The projections 61a are sized and configured to fit into slots formed on the end plate 40. When in this position, the stuffing horn 60 is then slid downward and the projections 61a are prevented from horizontal movement by the projections 41a, 41b, 42a and 42b. This provides for a very rapid loading of the stuffing horn 60 as no mechanical fasteners are needed. To remove the stuffing horn 60, the workers simply raise up the stuffing horn until the projections 61a are past the projections 41b, 42b and is pulled to the left, as viewed in FIG. 7. Therefore, when the shirred casing on the stuffing horn 60 is used, it is very quick and easy to replace the stuffing horn 60 with another stuffing horn that has been preloaded with shirred casings so that production is interrupted for only a short period of time.

Figure 4:
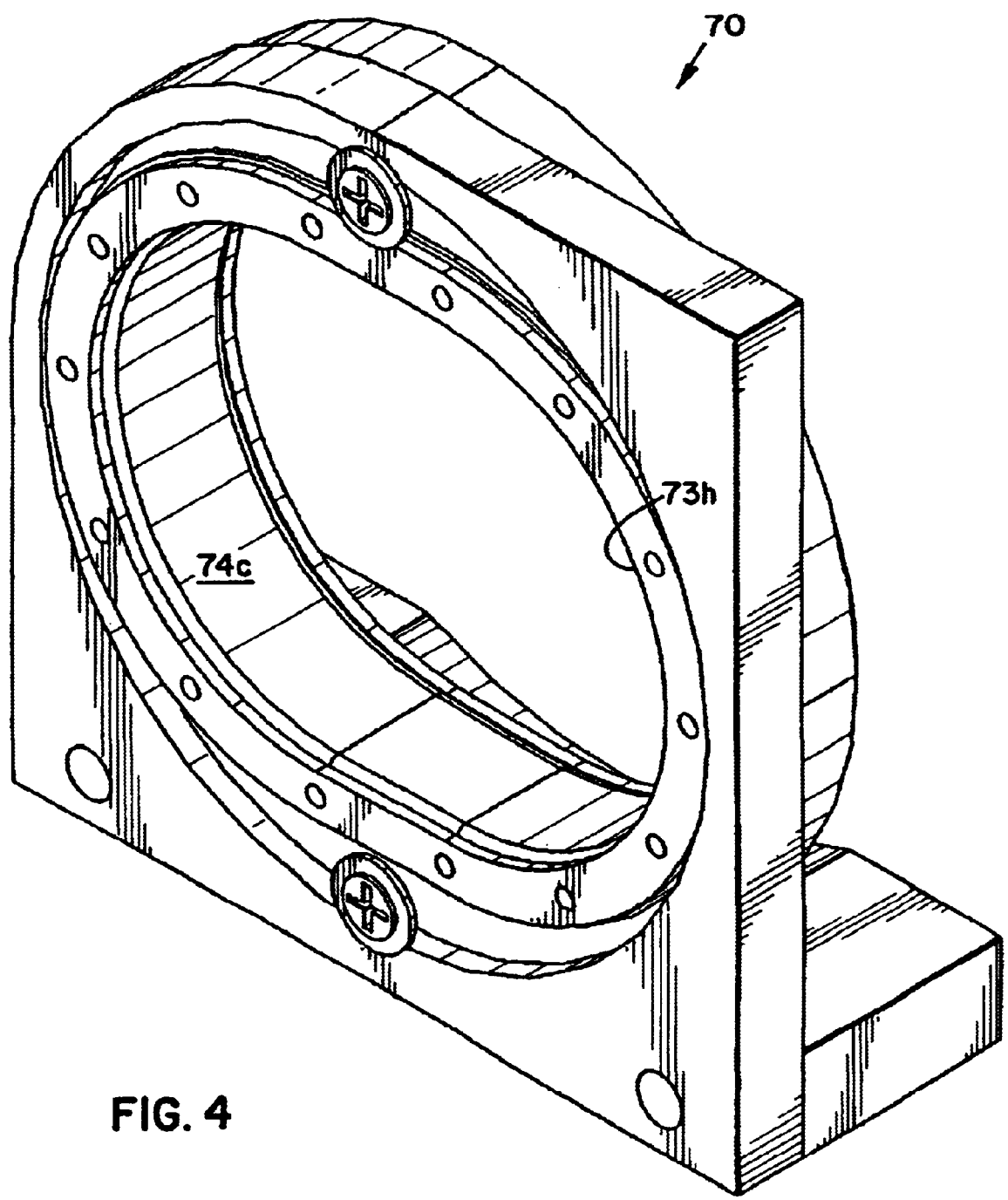
FIG. 4 is a perspective view of the skin brake of the stuffing apparatus shown in FIG. 1.
Figure 5:
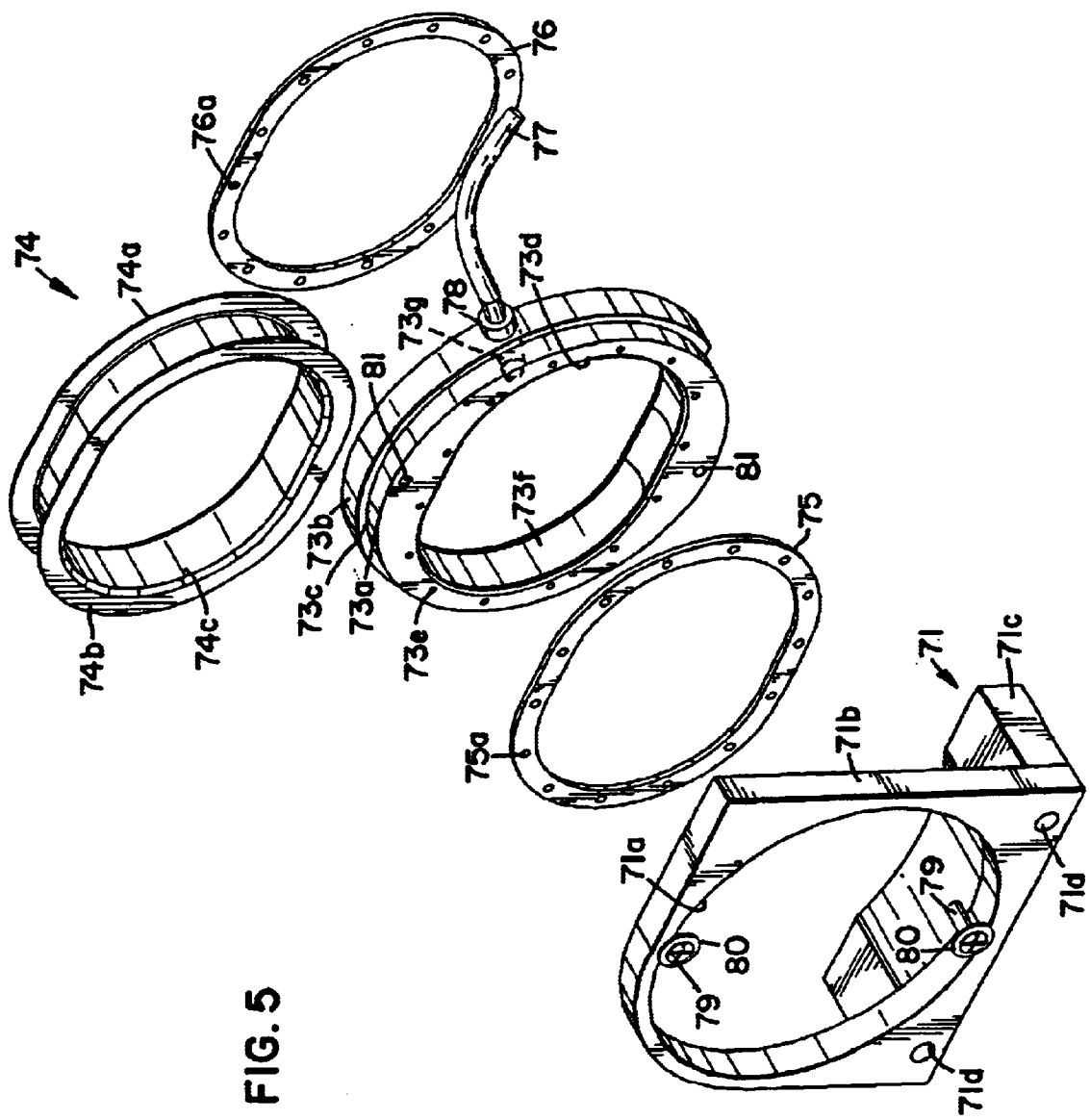
FIG. 5 is an exploded perspective view of the skin brake shown in FIG. 4.
Figure 6:
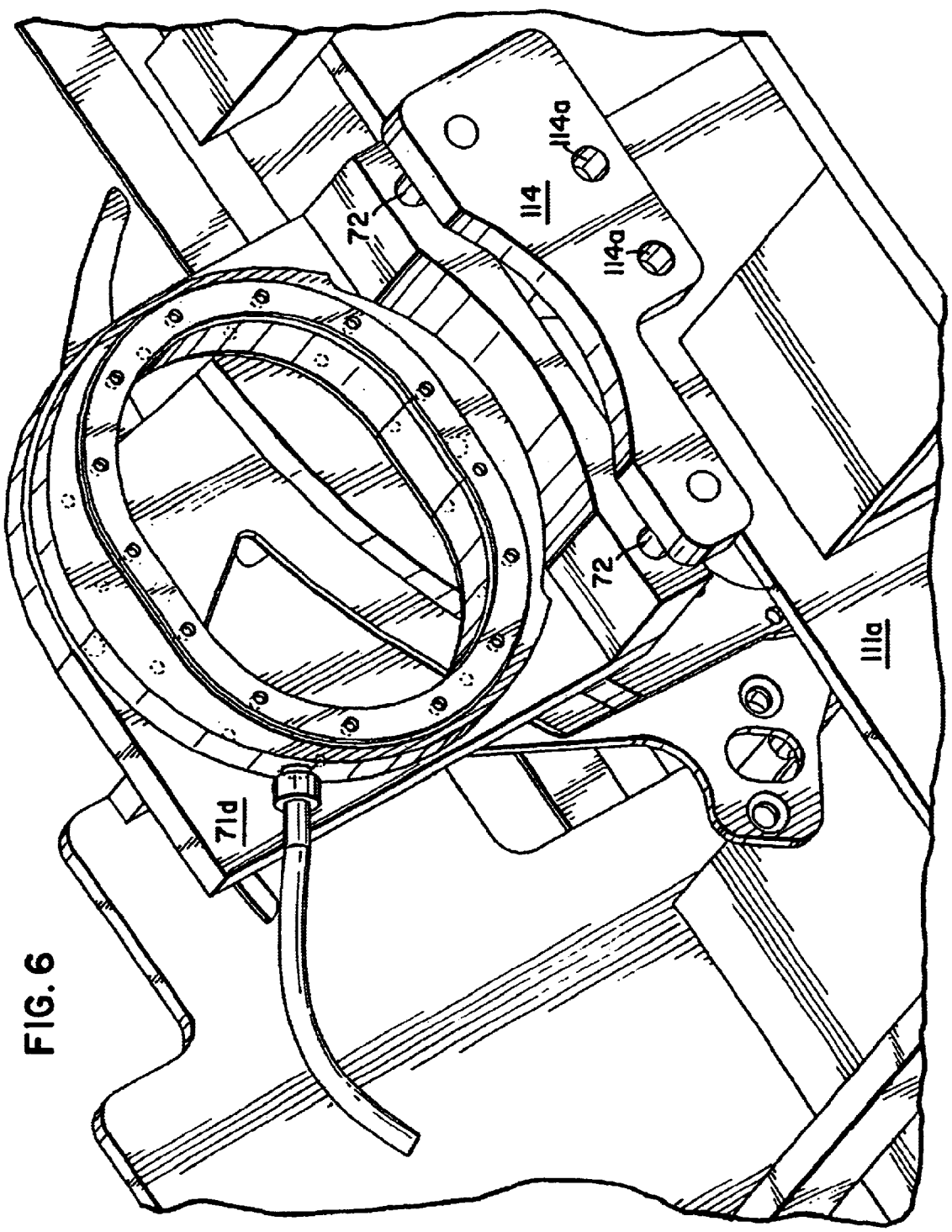
FIG. 6 is an enlarged perspective view of the skin brake assembled on the stuffing apparatus shown in FIG. 1.

Referring now to FIGS. 4 through 6, there is shown a non-circular skin brake 70. FIG. 5 shows the skin brake 70 in an exploded perspective view and FIG. 4 shows the skin brake 70 assembled. FIG. 6 illustrates one method of mounting the skin brake 70. The skin brake 70 includes a mounting member 71 that is utilized to mount the skin brake 70 in a position so that it may be received at the end of the elongate member 62. The mounting member 70 has an opening 71a in the plate 71b. The base 71c is operatively connected to the plate 71b by suitable means such as welding. The plate 71b has two bores 71b that extend through the plate and also through the base 71c for receiving rods 72 which are further used in position the skin brake 70 proximate the stuffing horn 60. An inflation member 73 has a stepped circular outer circumference having two surfaces 73a, 73b. The circumference 73a is sized and configured to fit inside of the opening 71a and the wall 73c is positioned against the back of the plate 71b, as shown in FIG. 6. The ring shaped inflation member 73 may be formed from any suitable material such as a plastic. The opening 73d is non-circular in shape and preferably oval. The shape is sized and configured to fit around the stuffing horn 60 and to have a similar cross section configuration. A bladder 74 is sized and configured to fit in the opening 73d. The bladder has a first side 74a operatively connected to a second side 74b by a casing engaging member 74c. Two mounting rings 75, 76 have a plurality of holes 75a, 76a formed therein. The holes 75a are in alignment with holes 73e formed in the inflation member 73. In viewing FIG. 5, holes similar to holes 73e are formed in the back side of the inflation member 73 and the holes 76a are in alignment with the holes (not shown) on the back of inflation member 73. The bladder 74 is positioned such that the casing engaging member 73c is around the wall or circumference 73f of the opening 73d. The second side 74b extends past the opening 73d and is positioned between the mounting ring 75 and the inflation member 73. Similarly, the first side 74a extends upward from the opening 73d in this position between the mounting ring 76 and the inflation member 73. Therefore, when screws are inserted through the opening 75a into hole 73a and screws through the holes 76a into similar holes, the side walls 74a, 74b are sealed against the inflation member 73. An inflatable chamber is therefore formed between the wall 73f and the casing engaging member 74c. A bore 73g extends through the inflation member 73 and provides a passageway for compressed air to enter the area between the casing engaging member 74c and the wall 73f. Compressed air is supplied from a source (not shown) through a hose 77 which is attached to a fitting 78 that is secured to the inflation member 73. The mounting rings 75, 76 seal the sides 74a, 74b against the inflation member 74c to provide for an air-tight chamber between the casing engaging member 74c and the wall 73f. Therefore, when compressed air is allowed to enter through the bore 73g, the casing engaging member 74c expands inwardly, like a balloon, thereby decreasing the opening 73h, which is defined by the casing engaging member 74c. The opening 73h is sized and configured to fit around the outer wall of the elongate member 62, as will be described more fully hereafter. After the bladder 74 has been assembled on to the inflation member 73, the inflation member 73 is secured in the mounting member 71 by screws 79 and washers 80. The screws 79 are secured in holes 81 while 73c is adjacent the back wall 71b of the plate and the additional diameter of the circumference 73b prevents the inflation member 73 from going further through the opening 71a in a direction to the left, as viewed in FIG. 5. The screws 79 and washers 80 prevent the inflation member 73 from moving to the right, as viewed in FIG. 5. The bladder 74 may be formed from any suitable elastic material, such as a tan gum rubber or FDA approved urethane.

The present invention is for use with an automatic tying machine to tie, or clip, the ends of the shirred casings after the meat product has been stuffed. The type of tying apparatus that is used may take on any number of sizes, configurations and models. One particular tying machine that may be utilized is the Tipper Tie Model 4202 available from Tipper Tie, Inc. of Apex, N.C. The tying machine is generally designated at 110 and includes a frame 111. The frame 111 includes a plate 111a. Also, the punch assembly 112 is shown as are the jaws 113. Again, these are shown for general reference and any suitable tying machine may be utilized. The other components of the tying machine are not shown, as it does not form a part of the present invention, as any suitable tying machine may be used.

The Applicant has found that it is advantageous to attach the skin brake 70 to the frame 111 of the tying apparatus 110. However, it is understood that other methods of positioning the skin brake 70 may be utilized by one skilled in the art. A mounting bracket 114 has two holes 114a through which bolts (not shown) are inserted and secure the mounting bracket 114 to the panel 111a. Rods 72 are secured to the mounting bracket 114. The mounting member 71 is slidably secured on the rod 72. The rods 72 are moved by suitable means such as a pneumatic cylinder (not shown).

In operation, a shirred casing (not shown) is preloaded on to the elongate member 62 of the stuffing horn 60. Any suitable casing, well known in the art, may be utilized. Also, the method of rucking the shirred casing on to the elongate member 62 is well known in the art. Typically several stuffing horns 60 are available so that the stuffing apparatus 10 may run without significant interruption. When the casing is depleted on one stuffing horn 60, it is a straightforward and quick way to simply lift the mounting plate end of the stuffing horn up and pull the stuffing horn out. A new rucked stuffing horn is inserted and the stuffing apparatus may continue production with minimal interruption by having available several rucked stuffing horns. When the stuffing horn is placed in position it is necessary for the skin brake 70 to be moved away from the apparatus 10 to allow clearance for the insertion of the stuffing horn. Then, once the stuffing horn 60 is in position, the skin brake 70 is moved back on the rods 72 to position the skin brake around the exterior of the elongate member 62. Compressed air is then fed into the skin brake 70 expanding the casing engaging member 74c to contact the shirred casing and place an even tension on the shirred casing. The skin brake 70 applies an even force around the exterior cross section of the elongate member 62. Since hams have typically been stuffed in an oval configuration, the elongate member 62 is preferably oval in cross section on both the inside and outside. However, it is understood that other shapes may be utilized. The skin brake 70 allows for even pressure to be provided around the circumference of the elongate member 62 on to the shirred casing. It is necessary that even pressure be exerted on the casing as it is being taken off of the elongate member 62 by the meat products 130 being stuffed into the shirred casing. The inflatable member 73 allows for this even pressure to be exerted. Air pressure inside bladder is typically in the range of 2–3 psi to provide suitable pressure.

Figure 8:
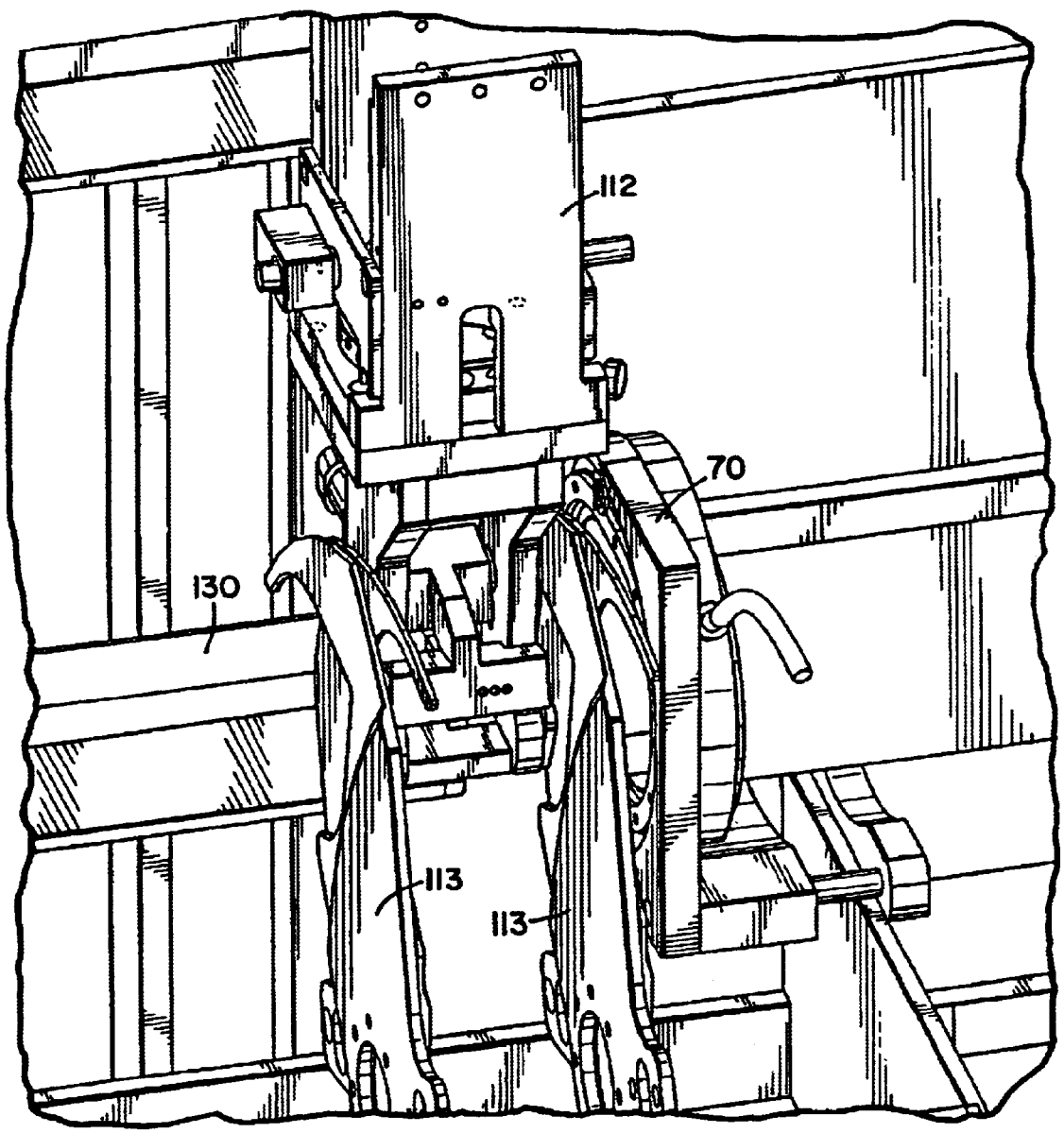
FIG. 8 is a perspective view of the stuffing horn and skin brake adjacent a clipping apparatus.
Figure 9:
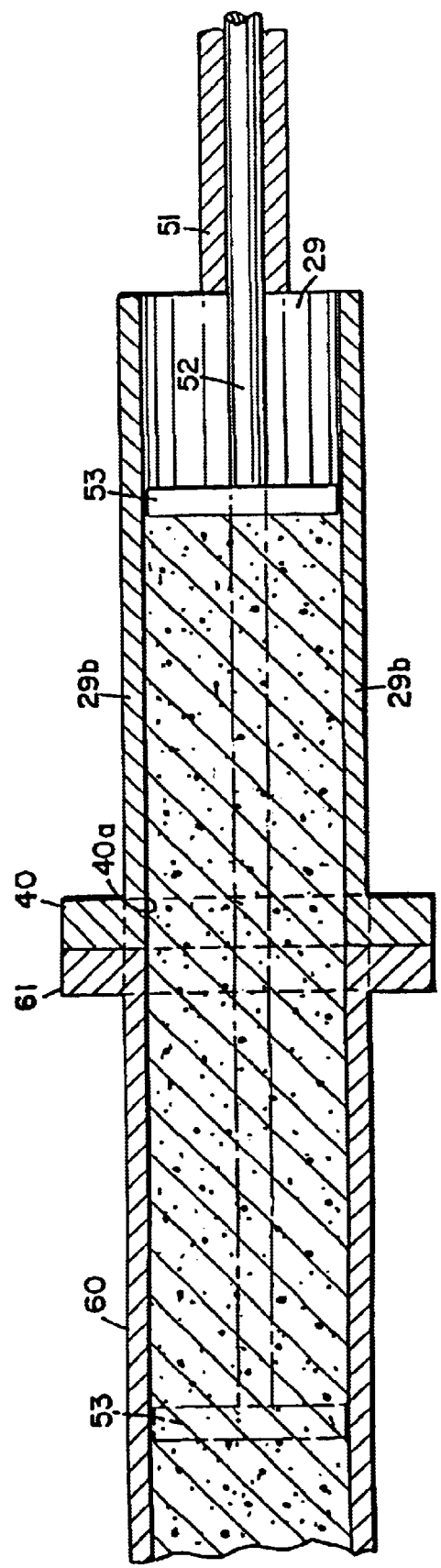
FIG. 9 is a cross-sectional view showing portions of the breach box and stuffing horn.

A worker is able to preload the breach boxes 29 with the meat product 130 to be stuffed. For hams, typically two to three pieces of muscle are provided in each breach box 29. A plurality of breach boxes 29 are available to allow for continuous production if the worker is required to be away from the loading station for a brief period of time. Once the meat product 130 has been loaded into the breach boxes, the conveyor is indexed forward. The indexing is typically done by a servo motor (not shown) to precisely control the movement of the conveyor belt 27, 28 which in turn controls the movement of the breach boxes 29. It is necessary that the cavity 29a of the breach boxes 29 be in alignment with the pushing plate 53 and opening 40a. Once the breach box 29 is in position, the cover 36 is lowered into position over the cavity 29a. This creates a chamber and the meat product is then ready to be pushed through the stuffing horn 60. The pushing mechanism 50 is then activated causing the slide 52 to extend. The cylinder assembly 51 may be any suitable cylinder, but Applicant has found the previously described two cylinder system to be beneficial. Both cylinders are activated and the pushing plate 53 is extended the full distance. For example, this may be a 40-inch activation by one cylinder and a two-inch activation by the second cylinder, thereby causing an extension of 42 inches. As can be seen in FIG. 9, the pushing plate 53 pushes the meat product 130 out of the cavity 29a, through the opening 40a and into the bore 62a of the elongate member. The pushing plate 53 extends approximately 1¾ inches past the skin brake 70. Referring to FIG. 8, the jaws 113 are shown in the clipping position. When the pushing plate 53 is extended beyond the skin brake 70, the jaws 113 and punch assembly 112 is out of position to allow the meat product 130 to be pushed to the location where the meat product 130 is shown in FIG. 8. Then the jaws 113 are activated and the end of the casing which includes the meat product 130 is clipped. The beginning portion of the next casing is then clipped to prepare it for receiving the next meat product 130. The pushing plate 53 is then retracted to approximately flush with the skin brake 70 and the tying apparatus is activated to clip the second end of the casing that has the meat product stuffed in it and to clip the first end of the casing which is about to be stuffed with a meat product 130. After the pushing plate has been retracted and the casings clipped, the cover 36 is raised and the process is then repeated.

The present invention provides for a faster, more efficient operation from the current labor intensive operation of hand stuffing the casings. Further, because shirred casings are able to be utilized, this is substantially less expensive than the individually sewn socks that were previously used. The preloading of the meat products 130 into the breach boxes 30 allow for the automated system to run effectively and efficiently. The inflation member 73 allows for even pressure to be placed around the shirred casing as the meat product 130 is being stuffed into the shirred casing. Prior art skin brakes were mechanically operated and were for circular stuffing horns. Stuffing horns of different shapes were not able to be used effectively because there was no easy mechanical means of applying pressure to the shirred casing around a shape other than a circular shape. The use of a inflatable bladder which has a configuration substantially the same as the outer configuration of the stuffing horn allows for pressure to be placed on the shirred casing even though the stuffing horn elongate member 62 is not circular but can, of course, still be used for a circular horn.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for stuffing a meat product in a casing, comprising:
    a) a conveyor having a plurality of holders for receiving a meat product, the holder having an exit;
    b) a pushing mechanism moveable between a first position and a second position, wherein movement of the mechanism on the second position moves the meat product out of the exit of the holder;
    c) a non-circular stuffing horn having a body with first and second open ends, the first end proximate the exit of the holder;
    d) a non-circular skin brake positioned around the stuffing horn; and
    e) the skin brake having a non-circular aperture and having an inflatable bladder around the aperture, wherein pressure is exerted on a casing as the meat product is stuffed in the casing.

2. A combination stuffing horn and skin brake for use with a stuffing apparatus for meat product, the combination comprising:
    a) a stuffing horn having an elongate member having a central bore, through which a meat product passes, the elongate member has an outer cross-section;
    b) a skin brake having an inflatable bladder, the bladder positioned around the elongate member;
    c) the bladder, when inflated, conforms to the outer cross-section, wherein pressure is exerted on a shirred casing as the casing is pulled over the horn as the meat product is stuffed into the casing.

3. The combination of claim 2, further comprising the outer cross-section is non-circular.

4. The combination of claim 2, wherein the bladder is inflatable with air.

5. A method of stuffing a meat product into a shirred casing, the method comprising:
    a) placing a shirred casing over a stuffing horn having an outer cross-section;
    b) inserting a meat product into a stuffing horn;
    c) inflating a bladder of a skin brake, wherein the bladder exerts an even pressure on the casing; and
    d) pushing the meat product through the stuffing horn and into the casing, thereby stuffing the meat product in the casing.

6. The method of claim 5, wherein the meat product is a ham.

7. The method of claim 5, wherein the outer cross-section is non-circular.

8. The method of claim 7, wherein the outer cross-section is oval.

9. The method of claim 8, wherein the ham comprises more than one piece of muscle.

10. The method of claim 8, further comprising:
    a) preloading a plurality of holders with the meat product; and
    b) conveying the holders to a position where the meat product is pushed through the stuffing horn.

11. The method of claim 10, further comprising securing both ends of the casing with the meat product in the casing.

* * * * *